United States Patent [19]

Ushikubo et al.

[11] Patent Number: 4,947,911
[45] Date of Patent: Aug. 14, 1990

[54] PNEUMATIC RADIAL TIRE SUITABLE FOR USE AT HIGH SPEED

[75] Inventors: Hisao Ushikubo; Teruyuki Tominaga, both of Kodaira, Japan

[73] Assignee: Bridgestone Corporation, Tokyo, Japan

[21] Appl. No.: 133,406

[22] Filed: Dec. 15, 1987

[30] Foreign Application Priority Data

Dec. 26, 1986 [JP] Japan .................. 61-308740

[51] Int. Cl.⁵ .................................... B60C 11/11
[52] U.S. Cl. ................................. 152/209 R
[58] Field of Search .......... 152/209 R, 209 D, 209 A, 152/DIG. 3, 555

[56] References Cited

U.S. PATENT DOCUMENTS

| | | | |
|---|---|---|---|
| 2,104,532 | 1/1938 | Sommer | 152/209 R |
| 3,631,911 | 1/1972 | Verdier | 152/216 |
| 3,698,462 | 10/1972 | Jacobs | 152/209 R |
| 4,296,789 | 10/1981 | Roberts et al. | 152/209 R |
| 4,416,316 | 11/1983 | Clatworthy et al. | 152/209 R |
| 4,722,378 | 2/1988 | Carolla et al. | 152/209 R |
| 4,744,400 | 5/1988 | Sekoguchi | 152/555 |

FOREIGN PATENT DOCUMENTS

| | | | |
|---|---|---|---|
| 3005651 | 8/1981 | Fed. Rep. of Germany | 152/209 D |
| 93609 | 6/1983 | Japan | 152/209 D |
| 268709 | 11/1987 | Japan | 152/DIG. 3 |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

When a radial tire is used at high speed (e.g. 250 km/h or more), tire blocks deform outward due to a centrifugal force applied to mass at the center of each block, so that contact pressure rises and therefore the tire is heated into blow out. To overcome this problem, the rubber thickness (gage) of the block partitioned by circumferential grooves and transverse grooves is reduced at the central area of the block. To reduce the rubber thickness, a shallow groove extending along the circumferential groove is formed in the middle of the block or a hole is formed at the center of the block.

8 Claims, 2 Drawing Sheets

PNEUMATIC RADIAL TIRE SUITABLE FOR USE AT HIGH SPEED

BACKGROUND OF THE INVENTION

1. Field of the Invention

The present invention relates to a pneumatic radial tire for four-wheeled vehicles and more specifically to thickness of blocks of a pneumatic radial tire suitable for use at high speed travel.

2. Description of the Prior Art

In conventional pneumatic radial tires, the tread is always formed with a plurality of circumferential grooves arranged at regular intervals, a plurality of transverse grooves intersecting the circumferential grooves and arranged at regular intervals along the tire circumferential direction, and blocks each partitioned by the above circumferential and transverse grooves. Further, the thickness of the blocks is always uniform extending from a center-side circumferential groove to an sidewall-side circumferential groove. That is, abovementioned uniform tread thickness is applied to all the prior-art tires, irrespective of size, usage, or aspect ratio of tires.

In the conventional radial tires, no problem will arise when the tire is used at travel speed less than 200 km/h. However, when tire travel speed exceeds 250 km/h, the tire blocks are pushed or projected into outwardly convex shape by centrifugal force due to high-speed tire rotation (this projection is the maximum at each block center). As a result, the tire presents a complicated tread contour having various outer block surfaces with different radii of curvatures. Once the originally-uniform contours or outer surfaces of the blocks deform during travel, the contact pressure between the tire and the ground increases extraordinarily at the centers of blocks (at which the tread projection reaches its maximum) as compared with that at the other areas of blocks. The fact that tire contact pressure is high indicates that compressive deformation of tire rubber is great. Further, after the tire block has passed through a contact time point with the ground, since the compressive deformation restores, the above-mentioned compressive deformation and restoration are repeated whenever the tread or block passes through the contact time points with the ground or for each tire revolution. In the case of the passenger cars, since the tire rotates 40 revolution per second at 300 km/h, the above-mentioned tire compressive deformation and restoration provide very severe conditions for the tire at the center of each block. The above repeated tire compressive deformations cause the tire to be heated in particular at the centers of blocks (because the centrifugal force is applied to the mass of the block and further the heat radiation effect is low as compared with the other areas of blocks). This results in a problem in that tire rubber changes in quality (into sponge state) due to heat and therefore the tire blocks are easily blown out.

SUMMARY OF THE INVENTION

With these problems in mind, therefore, it is the primary object of the present invention to provide a pneumatic radial tire for use at high speed which can solve the above-mentioned drawbacks (blow out).

To achieve the above-mentioned object, a pneumatic radial tire, according to the present invention, having a tread including a cylindrical crown portion and a pair of sidewalls extending radially inward from both ends of the crown portion and formed with a plurality of circumferential grooves extending in a circumferential direction of the tire on the crown portion, a number of transverse grooves intersecting the circumferential grooves and arranged at substantially regular intervals along the circumferential direction, and blocks partitioned by the circumferential grooves and the transverse grooves, characterized in that a rubber thickness at a central area of each of the blocks of the tread is substantially smaller than that at end areas near each of the blocks of the tread.

In the first aspect of the present invention, a relatively shallow groove extending along the circumferential groove is formed in the block at a position where a width of the block is substantially bisected.

In the second aspect of the present invention, a hole having a diameter of 3 to 7 mm and extending in a normal direction with respect to the block outer surface is formed substantially at the center of the block.

BRIEF DESCRIPTION OF THE DRAWINGS

The features and advantages of the pneumatic radial tire according to the present invention will be more clearly appreciated from the following description taken in conjunction with the accompanying drawings in which like reference numerals designate the same or similar elements or sections throughout the figures thereof and in which.

DETAILED DESCRIPTION OF THE PREFERRED EMBODIMENTS

With reference to the attached drawings, a first embodiment of the pneumatic radial tire according to the present invention will be described hereinbelow.

Figure 1:
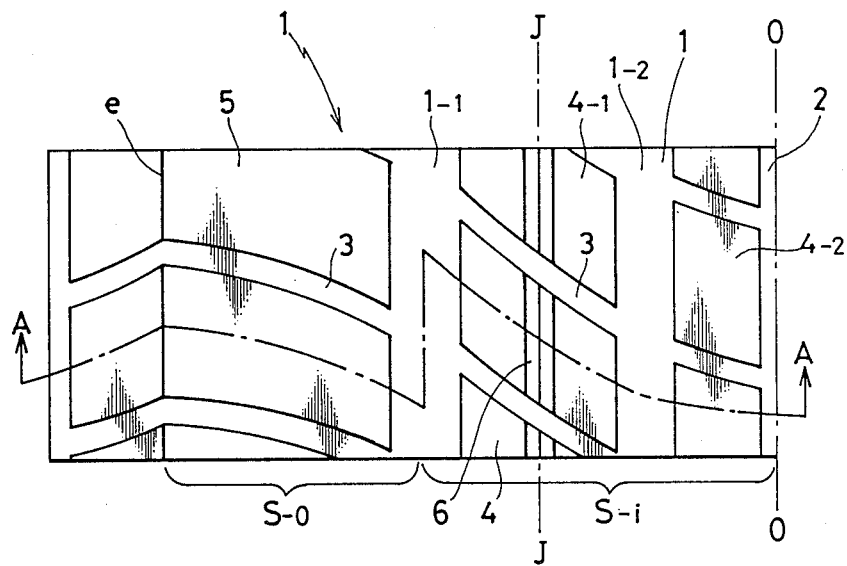
FIG. 1 is an expanded plan view showing the tread of a first embodiment of a pneumatic radial tire according to the present invention, in which only a partial lefthand half of the circumferential portion thereof is shown.

FIG. 1 shows the lefthand half of a tread of the radial tire. Although the righthand half of the tread is not shown, the tread is of course symmetrical with respect to the equatorial plane O—O.

Although not shown completely, the tread is formed into a toroidal shape, as is usual, from one sidewall, through a crown portion, to the other sidewall. A metallic bead core is buried at an radially inward end of each of the sidewalls. Between the two bead cores, the tire is constructed by a so-called radial carcass and an inextensible belt layer which reinforces the carcass. The carcass includes at least one ply formed by arranging fiber cords represented by nylon, polyester, rayon, etc. in a direction substantially perpendicular to the tire equatorial plane.

The inextensible belt layer is arranged on the crown portion of the carcass along the circumferential direction thereof and includes a multilayer structure formed by arranging high modulus-elastic cords such as metal or aromatic polyamide fiber (known as Kevlar in trademark) so as to cross the tire equatorial plane at a small angle and laid one another so that the arranged cords intersect each other. The maximum width of the belt layer is substantially equal to the width of the rubber tread positioned on the belt layer.

Further, the outer circumferential surface of the sidewalls are covered by a flexible rubber layer, and further the entire inner circumferential surface of the carcass is covered by an inner liner of high air impermeability. The above-mentioned structure of pneumatic radial tires is well known.

In FIG. 1, the tread 1 is formed with a plurality of circumferential grooves in symmetry with respect to the equatorial plane O—O (although the righthand half is not shown). In the first embodiment shown, the circumferential grooves are composed of a first wide main groove 1-1 extending in a straight line along the circumferential direction of the tire at a boundary between a central area S-i and a side area S-o of the tread. A relatively narrow central groove 2 extends along the circumferential direction thereof on the equatorial plane O—O. A second wide main groove 1-2 extends in the same way between the first groove 1-1 and the central groove 2 (biased a little toward the center). Further, it is preferable that the position of the first wide main groove 1-1 which partitions the central area S-i and the side area S-o is located at a point 50 to 70% of D away from the equatorial plane O—O, where D denotes an axial distance between the equatorial plane O—O and the tread end e. Between the two circumferential grooves, a plurality of blocks 4 are partitioned between the two circumferential grooves by transverse grooves 3 arranged substantially at regular intervals along the circumferential direction. In this embodiment, the transverse grooves 3 extend from the central circumferential groove 2 to the tread end e, through the main circumferential grooves 1-2 and 1-1 in such an undulate way that acute intersection angles between the transverse grooves 3 and the equatorial plane O—O decrease from the equatorial plane O—O to the first main groove 1-1 but inversely increase from the first main groove 1-1 to the tread end e. As a result, relatively broad blocks 5 are partitioned by the first main groove 1-1 and the transverse groove 3. Further, the transverse grooves are arranged in mirror symmetry with respect to the equatorial plane O—O.

The feature of the present invention is to reduce the gauge (tread rubber thickness) of the central areas of blocks partitioned by the circumferential grooves and the transverse grooves as compared with that of the end areas of blocks near the circumferential grooves.

To reduce the gauge of the blocks at the central areas thereof, in this first embodiment shown in FIG. 1, a shallow groove 6 is formed along a line J—J on the blocks 4-1 partitioned between the main circumferential grooves 1-1 and 1-2 by the transverse grooves 3 in order to reduce the relative thickness or weight of the blocks 4. The cross section of the narrow groove 6 is of V-shape in FIG. 2. Without being limited thereto, however, the cross section of U-shape or circular arc shape can be formed. In any case, the deepest position of the shallow groove 6 is substantially located at the center of the block in the axial direction of the tire. The depth h of the shallow groove 6 is about from 0.5 to 2 mm according to the tire size, and the width thereof is determined wider than a value of the depth h. Further, it is also possible to determine the width of the narrow groove 6 to be equal to the axial width of the block 4 according to conditions. Further, in FIG. 1, the shallow groove 6 is formed parallel to the equatorial plane.

Without being limited thereto, it is also possible to form the shallow groove 6 being inclined at an angle with respect to the line J—J or in zigzag or undulate fashion along the longitudinal direction thereof. Furthermore, in FIG. 1, the shallow groove 6 is formed only on the blocks 4-1. However, it is also possible to form the similar shallow groove 6 on the relatively small blocks 4-2 or the blocks 5 in the side area S-0. On the other hand, it is not preferable to form the shallow groove 6 only on the blocks 5 in the side area S-0.

Figure 2:
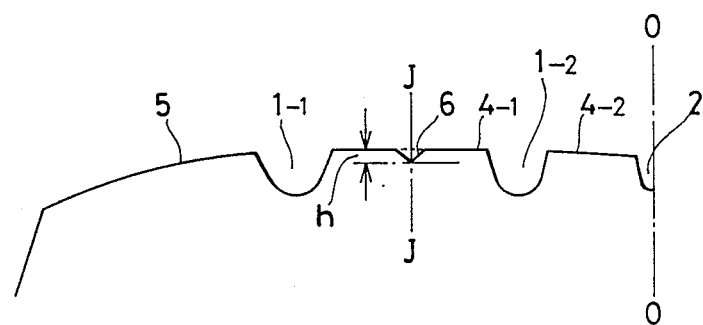
FIG. 2 is a cross-sectional view taken along the line A—A shown in FIG. 1.
Figure 3:
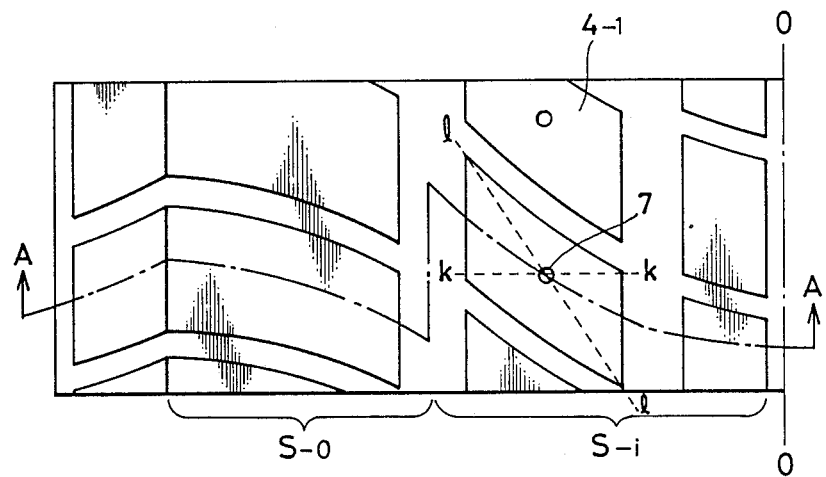
FIG. 3 is a similar expanded plan view showing the tread of a second embodiment of a pneumatic radial tire according to the present invention.

FIG. 3 shows a second embodiment. In this embodiment, a hole 7 is formed at the center (a point of intersection of two diagonal lines k-k and l-l of the block 4-1 in order to reduce the block gage at the blocks 4-1. The depth $h_a$ of the hole 7 is roughly equal to or less than the depth H of the main groove 1 and preferably 35 to 75% of the depth H when the diameter A of the hole 7 is 3 to 7 mm. On the other hand, where the depth $h_a$ of the hole 7 is very small as the shallow groove 6 shown in FIG. 2, it is necessary to increase the diameter A of the hole 7 markedly. Further, the shape of the bottom of the hole 7 can be flat or concave; and the shape of the hole 7 can be circular, oral, polygonal, etc. Further, the reference numeral 8 denotes a chamfered portion.

Test

Figure 4:
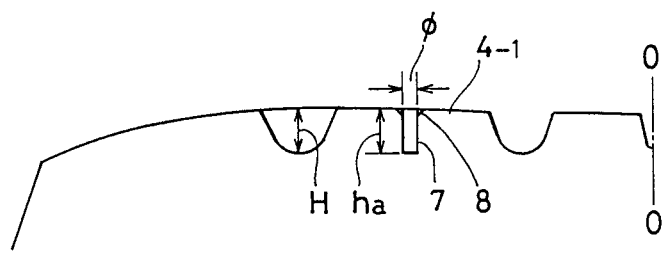
FIG. 4 is a cross-sectional view taken along the line A—A shown in FIG. 3.

To verify the effect of the tires according to the present invention, high speed durability tests have been effected on the basis of tires 255/40 VR17 attached to test drums.
(Tire structure)
 Carcass:
  2 plies of rayon cords arranged in a direction perpendicular to the tire equatorial plane (radial direction)
 Belt:
  2 plies of steel cords arranged at 20° with respect to the tire circumferential direction being laid one upon another so as to intersect each other on the crown portion of the carcass, and further a ply of nylon cord arranged over the steel cords in parallel to the tire equatorial plane in spiral fashion.
 Tread:
  Invention tires 1 were prepared as shown in FIGS. 1 and 2. Invention tires 2 were prepared as shown in FIGS. 3 and 4. Comparative (prior art) tires having no shallow groove 6 or no hole 7 were prepared. The specifications of these tires are listed below:

| Tires | Invention 1 | Invention 2 | Prior art |
|---|---|---|---|
| Tread width (e-e) | | 230 | |
| Width of groove 1 | | 10 | |
| Width of groove 2 | | 5 | |
| Width of groove 3 | | 5 | |
| Depth of groove 1 | | 6.5 | |
| Depth of groove 2 | | | |
| Shallow groove 6 | | | |
| Width | 3 | — | — |
| Depth | 1 | — | — |
| Hole 7 | | | |
| Diameter | — | 4 | — |
| Depth | — | 3 | — |

Unit: mm (Test Method)

The above tires were mounted to a rim of 9×17, inflated with air into an internal pressure of 3.3 kg/cm, and then mounted on a 2 m-dia. steel drum with a smooth surface in order to achieve durability tests. The tire load was 500 kg and the room temperature was 22° C.

Drum travel tests were started from an initial speed of 200 km/h. After rotated without trouble for 10 minutes, the speed was successively increased by 10 km/h and so on. The above speed-time test was continued until the tire was blown out.

Invention tires 1:

The tires were continuously rotated up to 360 km/h without trouble. However, the tires were blown out at block 4-1 after 5 minutes at 370 km/h.

Invention tires 2:

The tires were continuously rotated up to 360 km/h without trouble. However, the tires were blown out at block 4-1 after 2 minutes at 370 km/h.

Prior-art tires:

The tires were continuously rotated up to 340 km/h without trouble. However, the tires were blown out at blocks 4-1 and 4-2 after 5 minutes at 350 km/h.

What is claimed is:

1. A 4-wheel vehicle pneumatic tire for use at high speed travel comprising: a cylindrical tread; a pair of sidewalls extending radially inward from both ends of the tread; a radial carcass extending from a radially inner end portion of one sidewall to a radially inner end portion of the other sidewall through the tread; and an inexstensible belt layer arranged on the crown portion of the carcass; said cylindrical tread being formed with a plurality of straight grooves extending in a circumferential direction to the tire, a plurality of transverse grooves extending from the center of the tread to each lateral end in an undulated pattern, blocks partitioned by said straight grooves and said transverse grooves, wherein said blocks comprise a narrow groove extending parallel to the straight groove extending in the circumferential direction at a position where a width of the block is substantially bisected and, said narrow groove has a depth in the range of 0.5 to 2 mm and having a width wider than said depth but less than the width of the block it is located within, wherein said tire is a 4-wheel vehicle tire.

2. The pneumatic tire for use at high speed travel as set forth in claim 1, wherein the narrow groove has a V-shape cross-section.

3. The pneumatic tire for use at high speed travel as set forth in claim 1, wherein the narrow groove has a U-shape cross-section.

4. The pneumatic tire for use at high speed travel as set forth in claim 1, wherein the narrow groove has a circular arc cross-section.

5. The pneumatic tire for use at high speed travel as set forth in claim 1, wherein said straight grooves extending in the circumferential direction comprise a pair of first main grooves, each of said first main grooves located in symmetry with respect to the equatorial plane toward said tread end and a pair of second main grooves located in symmetry with respect to said equatorial plane at a position between each of said first main grooves and said equatorial plane, and the blocks partitioned by said first and second main grooves include said narrow groove.

6. A 4-wheel vehicle pneumatic tire for use at high speed travel comprising: a cylindrical tread; a pair of sidewalls extending radially inward from both ends of the tread; a radial carcass extending from a radially inner end portion of one sidewall to a radially inner end portion of the other sidewall through the tread; and an inexstensible belt layer arranged on the crown portion of the carcass; said cylindrical tread being formed with a plurality of straight grooves extending in a circumferential direction to the tire, a plurality of transverse grooves extending from the center of the tread to each lateral end in an undulated pattern, blocks partitioned by said straight grooves and said transverse grooves, wherein said blocks comprise a narrow groove having a V-shape in cross section and extending parallel to the straight groove extending in the circumferential direction at a position where a width of the block is substantially bisected, said narrow groove has a depth in the range of 0.5 to 2 mm and having a width wider than said depth but less than that the width of the block it is located within, wherein said straight grooves extending in the circumferential direction comprise a pair of first main grooves, each of said first main grooves located in symmetry with respect to the equatorial plane toward said tread end and a pair of second main grooves located in symmetry with respect to said equatorial plane at a position between each of said first main grooves and said equatorial plane and the blocks partitioned by said first and second main grooves include said narrow groove, wherein said tire is a 4-wheel vehicle tire.

7. A 4-wheel vehicle pneumatic tire for use at high speed travel comprising: a cylindrical tread; a pair of sidewalls extending radially inward from both ends of the tread; a radial carcass extending from a radially inner end portion of one sidewall to a radially inner end portion of the other sidewall through the tread; an inexstensible belt layer arranged on the crown portion of the carcass; said cylindrical tread being formed with a plurality of straight grooves extending in a circumferential direction to the tire, a plurality of transverse grooves extending from the center of the tread to each lateral end in an undulated pattern, blocks partitioned by said straight grooves and said transverse grooves, wherein said blocks comprise a narrow groove having a U-shape in cross section and extending parallel to the straight groove extending in the circumferential direction at a position where a width of the block is substantially bisected, said narrow groove has a depth in the range of 0.5 to 2 mm having a width wider than said depth but less than the width of the block it is located within, wherein said straight grooves extending in the circumferential direction comprise a pair of first main grooves, each of said first main groove located in symmetry with respect to the equatorial plane toward said tread end and a pair of second main grooves located in symmetry with respect to said equatorial plane at a position between each of said first main grooves and said equatorial plane, and the blocks partitioned by said first and second main grooves include said narrow groove, wherein said tire is a 4-wheel vehicle tire.

8. A 4-wheel vehicle pneumatic tire for use at high speed travel comprising; a cylindrical tread; a pair of sidewalls extending radially inward from both ends of the tread; a radial carcass extending from a radially inner end portion of one sidewall to a radially inner end portion of the other sidewall through the tread; an inextensible belt layer arranged on the crown portion of the carcass; said cylindrical tread being formed with a plurality of straight grooves extending in a circumferential direction to the tire, a plurality of transverse grooves extending from the center of the tread to each lateral end in an undulated pattern, blocks partitioned by said straight grooves and said transverse grooves, wherein said blocks comprise a narrow groove having a circular arc in cross section and extending parallel to the straight groove extending in the circumferential direction at a position where a width of the block is substantially bisected, said narrow groove has a depth in the range of 0.5 to 2 mm and having a width wider than said depth but less than the width of the block it is located within, wherein said straight grooves extending in the circumferential direction comprise a pair of first main grooves, each of said first main grooves located in symmetry with respect to the equatorial plane toward said tread end and a pair of second main grooves located in symmetry with respect to said equatorial plane at a position between each of said first main grooves and said equatorial plane, and the blocks partitioned by said first and second main grooves include said narrow groove, wherein said tire is a 4-wheel vehicle tire.

* * * * *